Sept. 5, 1944.  W. W. KRAFT  2,357,664
DISTILLATION OF HYDROCARBONS
Filed May 30, 1942
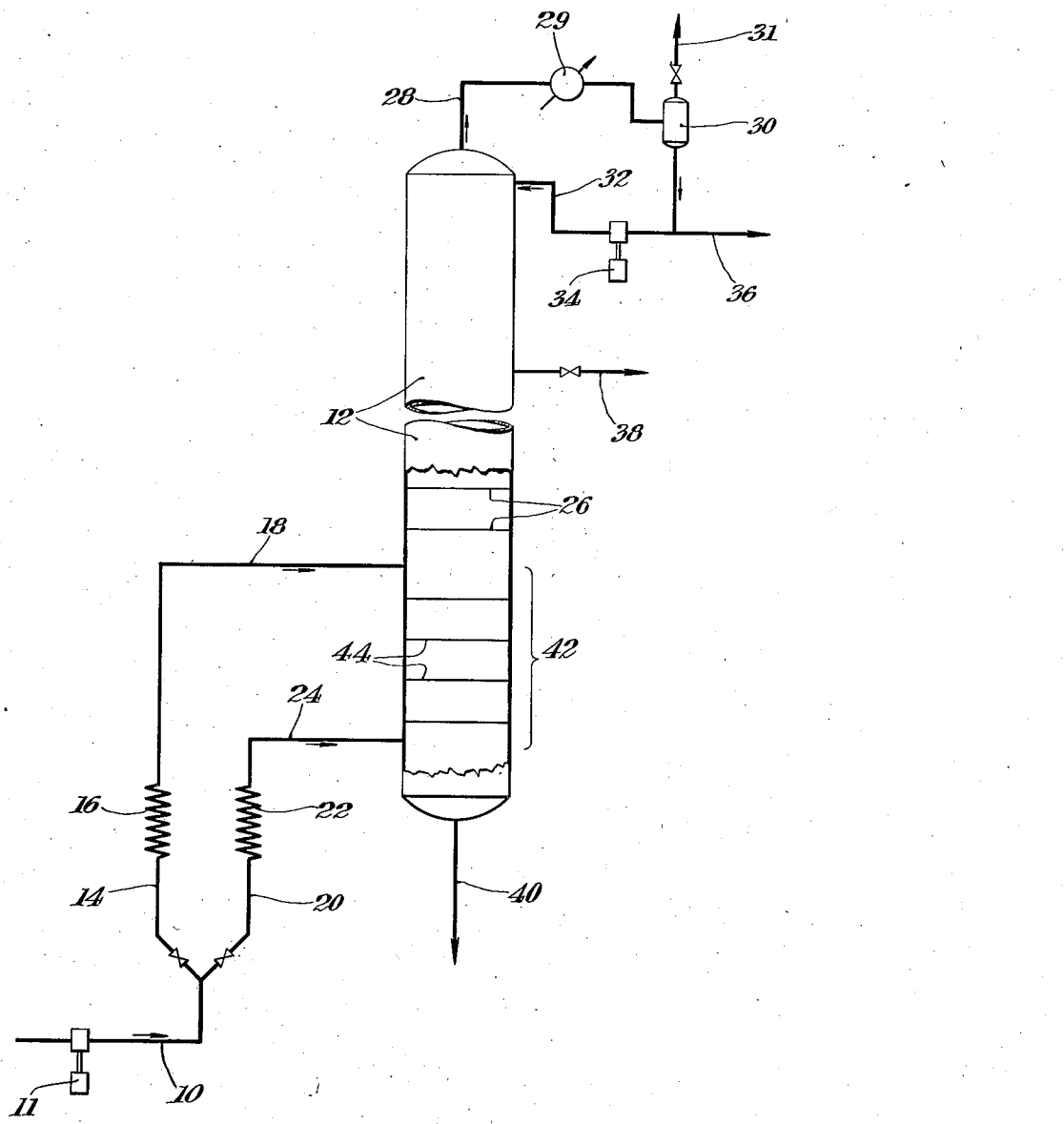
INVENTOR
*Wheaton W. Kraft*
BY *Nathaniel Ely*
ATTORNEY Patented Sept. 5, 1944

2,357,664

UNITED STATES PATENT OFFICE 2,357,664

DISTILLATION OF HYDROCARBONS

Wheaton W. Kraft, Scarsdale, N. Y., assignor to The Lummus Company, New York, N. Y., a corporation of Delaware Application May 30, 1942, Serial No. 445,126

3 Claims. (Cl. 196—82)

This invention relates to the distillation of complex liquid mixtures such as petroleum and various fractions thereof.

In the distillation of a hydrocarbon mixture such as crude petroleum or the like for the separation thereof into particular fractions, it is often desirable to sharply separate the light distillate components from the heavy residual components of such mixture. Such operation requires the stripping from the heavy residual bottoms product of any light distillate components retained therein in order to effect the desired sharp separation.

This stripping operation may be accomplished in several ways which have been generally practiced heretofore. For example, stripping steam may be introduced into the bottom of the distillation column, so that the retained light distillate components are vaporized by reason of the lowering of the partial pressure thereof because of the presence of the steam. In some cases, however, steam can not be used because the resulting mixture of steam and hydrocarbons is so highly corrosive or because certain of the hydrocarbons being separated are highly corrosive in the presence of steam. In addition, the operating pressure or other factors may also prevent the use of steam.

Reboiling of all or a portion of the bottoms from the column may also be practiced. In such operation, advantage can not be taken of the lifting effect of the light distillate component vapors since these components have been substantially separated from the bottoms; the latter, accordingly, must be heated to a sufficiently high temperature so that, when it is flashed within the column, it provides the heat necessary to vaporize the retained light distillate components from the descending unvaporized liquid. The use of reboiling is undesirable in some cases, however, since the necessary reboiling flash temperature, which is higher than the initial boiling point of the bottoms, may be so high as to cause undesirable cracking or other decomposition of the bottoms.

The primary object of my invention is to provide an improved stripping process which may be used in cases where steam stripping and/or reboiling are undesirable.

A further object of my invention is to provide for use in the distillation of hydrocarbons a stripping process which avoids the disadvantages of steam stripping and reboiling but which retains the advantages thereof.

Further objects and advantages of my invention will be apparent from the following description thereof taken in connection with the accompanying drawing, which is a flow sheet of a distillation system embodying my invention.

The principal feature of my invention resides in the splitting of the incoming feed stream into two portions, one of which is introduced into the distillation column at the customary feed point and the other of which is introduced into the bottom of the column, so that the two portions countercurrently contact each other in the stripping section of the column. The two portions of the feed stream are so proportioned and so heated in accordance with the composition thereof and the vaporization of each portion is so regulated that, when they are brought into countercurrent contact within the column, the light distillate components are substantially separated from the heavy residual components. Preferably, the vaporized percentage of the portion introduced into the bottom of the column is greater than that of the other portion.

According to my invention, the feed, which comprises a suitable hydrocarbon mixture such as a crude petroleum, a reduced crude, or the like, is introduced into the system through line 10 by means of pump 11. This feed is split into two streams, each of which is separately heated and introduced into column 12. One of these streams is passed through line 14, heater 16, and line 18 for introduction into the column at a mediate point thereof. Preferably, this mediate point corresponds generally to the feed point in customary operation. The other of these streams is passed through line 20, heater 22, and line 24 for introduction into the lower or bottom portion of column 12. Preferably, the point of introduction of this other stream is below the bottom deck in column 12 and corresponds generally to the point of introduction of stripping stream or reboiled bottoms in customary operation.

This hydrocarbon feed is separated in distillation column 12 into the particular fractions desired. The rising vapors are suitably fractionated in the rectifying section of the column, for which purpose bubble decks 26 or the like are provided. The overhead vapors from this column are removed through line 28 for condensation in condenser 29, the condensate from which is collected in receiver 30 provided with valved vent line 31. A portion of the condensate is returned through line 32 by means of pump 34 to column 12 as reflux, and the remainder of the condensate is withdrawn through line 36 as the overhead distillate product. One or more side streams may also be produced, and draw-off lines as at 38 may be provided for their withdrawal from column 12. The overhead distillate and the side streams contain the light distillate components present in the initial feed. The bottoms product in tower 12 is withdrawn through line 40 and comprises the heavy residual components present in the initial feed.

The splitting of the hydrocarbon feed into the two streams is desirably made in accordance with the composition thereof and in such a manner that the degree of vaporization of each stream can be easily regulated by the amount of heating to which each is subjected. In accordance with my invention, sufficient heat is imparted to the stream passing through heater 16 to effect vaporization of a major portion only of the light distillate components therein. On the other hand, sufficient heat is imparted to the stream passing through heater 22 to effect vaporization of not only all the light distillate components therein but also a minor portion of the heavy residual components therein. The desired vaporization may occur partially or entirely as each stream passes through its respective heater or by flashing as each stream is introduced into the column. In many cases it may be desirable to effect the splitting of the hydrocarbon feed in such a way that an equal amount of heat is imparted to each stream as it passes through its respective heater. The degree of vaporization of each stream can thereby be readily controlled. Heaters 16 and 22 may be independently heated; but it may also be desirable to use two separate coils symmetrically positioned in the same furnace. In such case, with the application of equal heat by radiation or otherwise to each coil, a variation of throughput of each stream effects the desired variation in the outlet temperatures of the streams since the absorption of heat by each stream is equal.

Upon the introduction of the first stream in line 18 into column 12, the vaporized portion thereof rises upwardly through the rectifying section of the column for separation into the desired overhead and side stream fractions, and the unvaporized portion thereof passes downwardly through the stripping section 42 of the column. In a similar manner, upon the introduction of the second stream in line 24 into column 12, the vaporized portion thereof rises upwardly through the stripping section 42 and into the rectifying section of the column, and the unvaporized portion thereof collects in the bottom of column 12 for removal through bottoms line 40. The separation of the vaporized portion from the unvaporized portion of each stream is preferably accomplished primarily by means of flashing upon introduction thereof into the column, and the second stream in line 24 is desirably heated sufficiently to effect a considerable degree of overflashing so that substantially complete vaporization of the light distillate components therein is insured.

In stripping section 42 the unvaporized portion of the first stream and the vaporized portion of the second stream are brought into intimate countercurrent contact by means of bubble decks 44 or the like. Upon countercurrent contact of these two streams under the preferred operating conditions, the unvaporized light distillate components in the first stream are substantially entirely vaporized, and the vaporized heavy residual components of the second stream are condensed. In this manner, substantially all the light distillate components in the initial hydrocarbon feed, which comprise the overhead and side stream products, are vaporized and separated from substantially all the heavy residual components, which comprise the bottoms product removed through line 40. The proportioning of the two streams and/or the amount of heat imparted thereto are desirably so regulated that the vaporization of the light distillate components and the removal of the resulting vapors thereof from the stripping zone without any entrained or vaporized heavy distillate components are assured. It will be apparent, however, that, with equal heating of both streams, the stream introduced into the lower portion of the column must be less than one-half of the initial feed stream.

By means of my invention, I can thus effect the desired separation of the light distillate components from the heavy residual components without resorting to the use of stripping steam or the use of a reboiling set-up. My invention is thus applicable to those types of stocks containing components which are highly corrosive either admixed with or in the presence of steam or containing components which are subject to cracking or other deleterious decomposition at the reboiling temperature necessary. In this connection, it is to be noted that the temperature to which the lower feed stream is heated in heater 22 is considerably lower than the temperature that would be required for reboiling of the bottoms since the flash distillation curve of the incoming feed stream is considerably lower than the flash distillation curve of the bottoms stream. Although I have disclosed my invention in connection with the distillation of a crude petroleum, it is equally applicable to any mixture of hydrocarbons which is to be separated into sharply defined fractions.

In one particular application of my invention to the separation of a crude petroleum containing a considerable percentage of heavy residual components, the light distillate components to be taken off as overhead and side streams comprised 40% of the incoming feed, and the heavy residual components to be removed as the bottoms stream comprised 60% of the incoming feed. The distillation temperature of this separation for this particular feed was approximately 600° F. This feed was split into two streams, one containing about 60% and the other about 40% thereof. The 60% stream was heated to a temperature of substantially 575° F., at which temperature approximately 33% of this stream was vaporized by flashing upon introduction into a distillation column; thus, only a major portion of the light distillate components was vaporized. This stream was introduced into a mediate point of the column. The 40% stream was heated to a temperature of substantially 625° F., at which temperature approximately 50% of this stream was vaporized by flashing upon introduction into the column; thus, all the light distillate components as well as a minor portion of the heavy residual components were vaporized. This stream was introduced into the bottom of the column. Upon countercurrent contact of the two streams in the stripping section of the column, the remaining light distillate components of the 60% stream were vaporized, and the vaporized heavy residual components of the 40% stream were condensed. In this way, the 40% of light distillate components were substantially completely separated from the 60% of heavy residual components.

Although I have described a preferred form of embodiment of my invention, I am aware that modifications may be made thereto; and I, therefore, desire a broad interpretation of my invention within the scope and spirit of the disclosure herein and the claims appended hereinafter.

I claim:

1. The method of distilling a hydrocarbon mixture in a distillation column to obtain a predetermined separation of the light distillate components from the heavy residual components thereof, which comprises splitting the hydrocarbon mixture into two streams, applying an equal quantity of heat to each stream to vaporize components thereof, proportioning said streams during the heating so that one stream comprises a larger quantity of oil than the other stream and securing a smaller amount of vaporization of the first stream by reason of the larger quantity being heated, introducing said first stream into the distillation column at a mediate point thereof, introducing the other stream into the bottom of the column, and bringing the liquid portion of said first stream and the vaporized portion of said other stream into countercurrent contact in the stripping section of the column to substantially separate the light distillate components therefrom.

2. The method of obtaining a predetermined separation of a hydrocarbon mixture into its light distillate components and its heavy residual components by distillation, which comprises dividing the hydrocarbon mixture into two streams, one of the resulting streams being larger in quantity than the other, passing each stream through a separate heating coil positioned in the same heating zone, subjecting each stream to an equal quantity of heat within said heating zone whereby vaporization of only a major portion of the light distillate components of the larger stream is effected and vaporization of all of the light distillate components and a minor portion of the heavy residual components of the smaller stream is effected, introducing the larger stream into a distilation column at a mediate point thereof, introducing the smaller stream into the bottom of the column and countercurrently contracting the liquid portion of the larger stream with the vaporized portion of the smaller stream to vaporize the remaining unvaporized light distillate components and to condense the vaporized heavy residual components.

3. The method as claimed in claim 2, in which the two streams are passed through separate coils having equal heating surfaces.

WHEATON W. KRAFT.